United States Patent
Katayama et al.

(10) Patent No.: US 11,395,324 B2
(45) Date of Patent: Jul. 19, 2022

(54) WIRELESS COMMUNICATION METHOD, WIRELESS COMMUNICATION SYSTEM AND BASE STATION DEVICE

(71) Applicant: NIPPON TELEGRAPH AND TELEPHONE CORPORATION, Tokyo (JP)

(72) Inventors: Yohei Katayama, Musashino (JP); Atsushi Taniguchi, Musashino (JP); Kenji Shimizu, Musashino (JP); Takahiro Yamazaki, Musashino (JP); Maiko Naya, Musashino (JP); Takashi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/047,361

(22) PCT Filed: Apr. 5, 2019

(86) PCT No.: PCT/JP2019/015104
§ 371 (c)(1),
(2) Date: Oct. 13, 2020

(87) PCT Pub. No.: WO2019/203023
PCT Pub. Date: Oct. 24, 2019

(65) Prior Publication Data
US 2021/0160914 A1    May 27, 2021

(30) Foreign Application Priority Data

Apr. 16, 2018   (JP) .............................. JP2018-078724

(51) Int. Cl.
  *H04W 72/04* (2009.01)
  *H04W 72/12* (2009.01)
  *H04W 72/14* (2009.01)

(52) U.S. Cl.
  CPC ... *H04W 72/1289* (2013.01); *H04W 72/0453* (2013.01); *H04W 72/0473* (2013.01); *H04W 72/1257* (2013.01); *H04W 72/14* (2013.01)

(58) Field of Classification Search
  None
  See application file for complete search history.

(56) References Cited

U.S. PATENT DOCUMENTS

2016/0234851 A1* 8/2016 Zhang .................. H04W 28/08
2018/0035248 A1* 2/2018 Soave .................. H04W 12/04
(Continued)

FOREIGN PATENT DOCUMENTS

JP    201785201 A    5/2017

OTHER PUBLICATIONS

Hideaki, Kanno et al. "Software Defined Radio." Oki Technical Review. Oct. 2005, pp. 80-85.

*Primary Examiner* — Kodzovi Acolatse

(57) ABSTRACT

This invention provides a radio communication method in a radio communication system including a base station apparatus and a radio signal processing apparatus for communicating with the base station apparatus, the radio communication method including granting radio control information that includes at least information specifying a radio scheme to be used as a parameter required for radio communication, to a packet and transmitting the packet from which the radio control information has been removed, by the radio scheme specified by the radio control information granted to the packet.

4 Claims, 6 Drawing Sheets

(56) References Cited

U.S. PATENT DOCUMENTS

| | | | |
|---|---|---|---|
| 2019/0349848 A1* | 11/2019 | Bali | H04W 16/14 |
| 2020/0205044 A1* | 6/2020 | Lin | H04L 65/1016 |
| 2020/0296741 A1* | 9/2020 | Ayala Romero | H04W 16/12 |
| 2021/0029630 A1* | 1/2021 | Yamazaki | H04W 88/10 |
| 2021/0092628 A1* | 3/2021 | Naya | H04W 24/10 |
| 2021/0227538 A1* | 7/2021 | Katayama | H04M 3/00 |

\* cited by examiner

| RADIO SCHEME | RADIO FREQUENCY | BAND | TRANSMISSION GAIN |
|---|---|---|---|
| 802.11a | a | b | c |
| 802.11g | d | e | f |
| ⋮ | ⋮ | ⋮ | ⋮ |

Fig. 6

WIRELESS COMMUNICATION METHOD, WIRELESS COMMUNICATION SYSTEM AND BASE STATION DEVICE

CROSS-REFERENCE TO RELATED APPLICATIONS

This application is a 371 U.S. National Phase of International Application No. PCT/JP2019/015104, filed on Apr. 5, 2019, which claims priority to Japanese Application No. 2018-078724 filed on Apr. 16, 2018. The entire disclosures of the above applications are incorporated herein by reference.

TECHNICAL FIELD

The present invention relates to a radio communication method, a radio communication system, and a base station apparatus.

BACKGROUND ART

There is a radio communication system including a radio signal processing apparatus which is an apparatus for executing radio signal processing, a radio communication apparatus including a base station apparatus, and a radio terminal such as an Internet of Things (IoT) device having many kinds of various requirements. Each radio terminal communicates with the radio communication apparatus by a radio scheme suitable for the requirement of the terminal itself. At least one of the radio signal processing apparatus and the radio communication apparatus executes radio signal processing by software (for example, see NPL 1).

The radio communication apparatus determines whether software responding to the radio scheme of the radio terminal has been downloaded to the radio communication apparatus. When the software has been downloaded to the radio communication apparatus, the radio communication apparatus performs radio signal processing. When the software has not been downloaded to the radio communication apparatus, the radio signal processing apparatus performs the radio signal processing instead of the radio communication apparatus.

As described above, the radio communication apparatus autonomously selects an apparatus that executes radio signal processing from the radio signal processing apparatus and the radio communication apparatus according to a required delay. The radio communication system can flexibly change the radio scheme by the selected base station apparatus and radio signal processing apparatus changing the software.

CITATION LIST

Non Patent Literature

NPL 1: Hideaki Kanno, Hideaki Odagiri, Kenji Takaro, "Software Defined Radio", OKI Technical Review, No. 204, Vol. 72 No. 4, October 2005, p. 80-85.

SUMMARY OF THE INVENTION

Technical Problem

However, in the method in which a plurality of radio schemes are switched in a time-division manner, time is also allocated to a radio scheme in which no communication occurs, and thus there is a problem that the usage efficiency of the base station apparatus is reduced.

In view of the above circumstances, an object of the present invention is to provide a technology capable of improving the usage efficiency of the base station apparatus.

Means for Solving the Problem

One aspect of the present invention provides a radio communication method in a radio communication system including a base station apparatus and a radio signal processing apparatus for communicating with the base station apparatus, the radio communication method including granting radio control information that includes at least information specifying a radio scheme to be used as a parameter required for radio communication, to a packet, and transmitting the packet from which the radio control information has been removed, by the radio scheme specified by the radio control information granted to the packet.

One aspect of the present invention provides the radio communication method described above further including with the parameter including a value of a radio frequency, a value of a band, and a value of a transmission gain specified to be used in radio communication, setting a value of the radio frequency, a value of the band, and a value of the transmission gain to the base station apparatus, in which the base station apparatus transmits the packet from which the radio control information has been removed, by the radio frequency, the band, the transmission gain that are set, in addition to the radio scheme.

One aspect of the present invention provides the radio communication method described above with the radio signal processing apparatus further including when one radio signal processing apparatus is capable of processing the plurality of radio schemes, performing, by the radio signal processing apparatus, a first selection of a radio scheme to be used for the radio communication from the plurality of radio schemes with reference to the packet to which the radio control information is granted in granting the radio control information, wherein the radio signal processing apparatus uses the radio scheme selected in the first selection to process the packet to which the radio control information is granted and transmit the processed packet to the base station apparatus.

One aspect of the present invention provides the radio communication method described above further including when one radio signal processing apparatus is capable of processing one radio scheme, performing a second selection of a radio signal processing apparatus capable of processing the packet to which the radio control information is granted with reference to the packet to which the radio control information is granted in granting the radio control information, wherein the packet to which the radio control information is granted is transmitted to the radio signal processing apparatus selected in the second selection, and the radio signal processing apparatus processes the packet to which the radio control information is granted using an available radio scheme and transmit the processed packet to the base station apparatus.

One aspect of the present invention provides a radio communication system including a base station apparatus and a radio signal processing apparatus that communicates with the base station apparatus, the radio communication system including a radio control information grant unit that grants radio control information including at least information specifying a radio scheme to be used as a parameter required for radio communication, to a packet, and a transmission unit that transmits the packet from which the radio control information has been removed, by the radio scheme specified in the radio control information granted to the packet.

One aspect of the present invention provides the radio communication system described above further including with the parameter including a value of a radio frequency, a value of a band, and a value of a transmission gain specified to be used in radio communication, a setting unit that sets a value of the radio frequency, a value of the band, and a value of the transmission gain to the transmission unit, in which the transmission unit transmits the packet from which the radio control information has been removed, by the radio frequency, the band, the transmission gain that are set, in addition to the radio scheme.

One aspect of the present invention provides a base station apparatus in a radio communication system including a base station apparatus and a radio signal processing apparatus that communicates with the base station apparatus, the base station apparatus including a receiving unit that receives a packet to which radio control information including at least information specifying a radio scheme to be used is granted as a parameter required for radio communication, and a transmission unit that transmits the packet from which the radio control information has been removed, by the radio scheme specified in the radio control information granted to the received packet.

One aspect of the present invention provides the base station apparatus further including with the parameter including a value of a radio frequency, a value of a band, and a value of a transmission gain specified to be used in radio communication, a setting unit that sets a value of the radio frequency, a value of the band, and a value of the transmission gain to the transmission unit, in which the transmission unit transmits the packet from which the radio control information has been removed, by the radio frequency, the band, the transmission gain that are set, in addition to the radio scheme.

Effects of the Invention

According to the present invention, it is possible to improve the usage efficiency of the base station apparatus.

BRIEF DESCRIPTION OF DRAWINGS

FIG. 6 is a diagram illustrating a specific example of a parameter acquisition table.

DESCRIPTION OF EMBODIMENTS

An embodiment of the present invention will be described below with reference to the drawings.

First Embodiment

Figure 1:
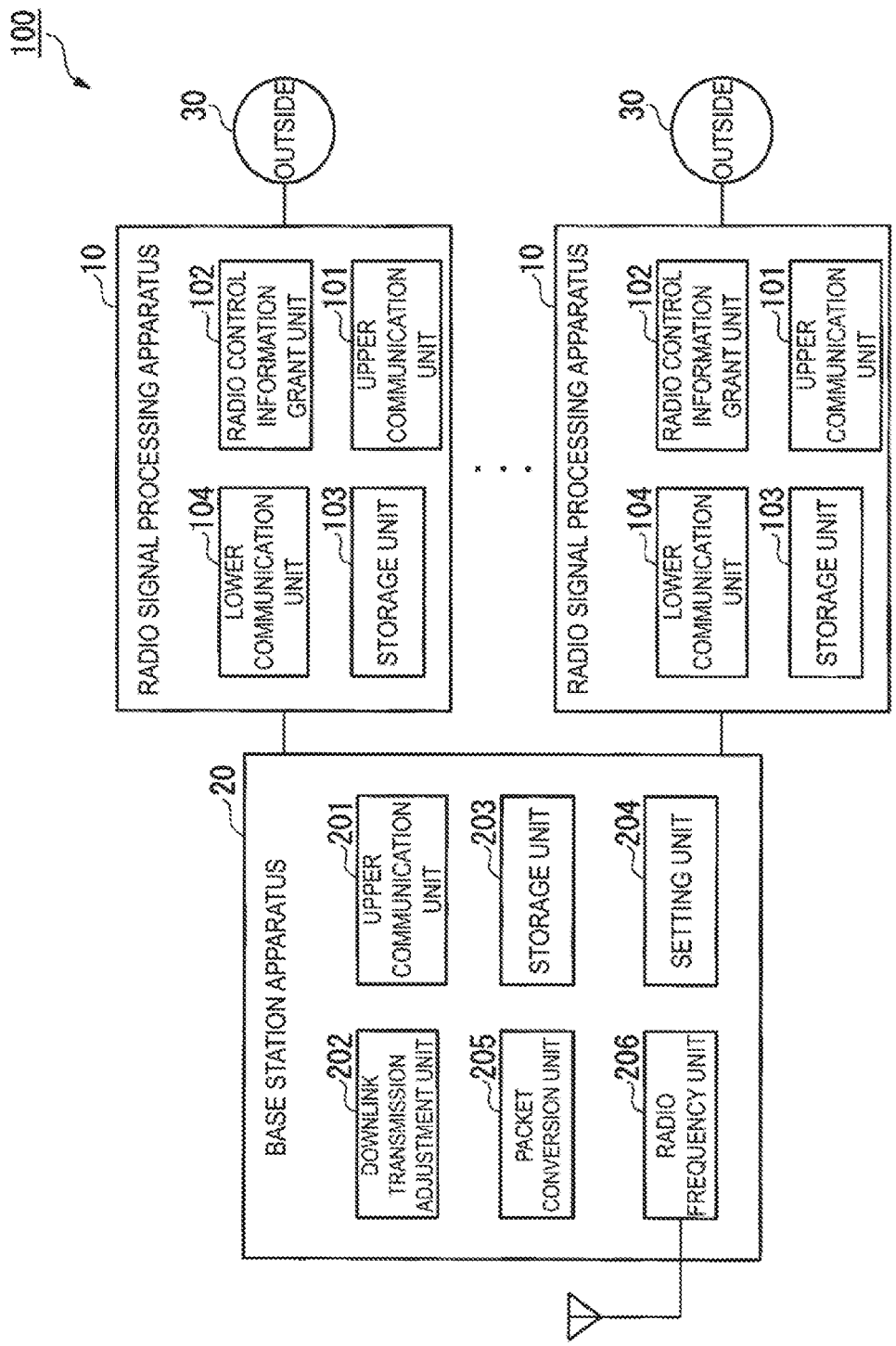
FIG. 1 is a configuration diagram illustrating a system configuration of a radio communication system according to a first embodiment.

FIG. 1 is a configuration diagram illustrating a system configuration of a radio communication system 100 according to a first embodiment.

The radio communication system 100 includes one or more radio signal processing apparatus 10 and one or more base station apparatus 20. Communication between the radio signal processing apparatus 10 and the base station apparatus 20 may be radio communication or wired communication. An outside system 30 that executes an application and the like connected to the radio communication system 100 is connected to the base station apparatus 20. Hereinafter, a direction of communication from the base station apparatus 20 to the radio signal processing apparatus 10 is referred to as "up". Hereinafter, a direction of communication from the radio signal processing apparatus 10 to the base station apparatus 20 is referred to as "down".

The radio signal processing apparatus 10 grants radio control information to a packet received from the outside system 30 and transmits the packet to the base station apparatus 20. The radio control information is a parameter required for the radio communication, for example, a radio frequency specifier, a band specifier, a transmission gain specifier, a radio scheme specifier, and a radio scheme specific parameter. Each value of the radio frequency specifier, the band specifier, the transmission gain specifier, the radio scheme specifier, and the radio scheme specific parameter is, for example, a value requested by a service provider that provides a radio communication service. Additionally, the radio signal processing apparatus 10 stores program data of software of one radio scheme, and changes software with the base station apparatus 20. Note that each radio signal processing apparatus 10 stores program data of software of a different radio scheme.

The base station apparatus 20 is an apparatus that executes communication by a plurality of the radio schemes. For example, the base station apparatus 20 executes communication by radio schemes by changing software with the radio signal processing apparatus 10. The base station apparatus 20 communicates with the radio terminal of each radio scheme by switching the plurality of radio schemes such as the 802.11 standard. The base station apparatus 20 is, for example, an access point responding to software defined radio (SDR). The radio scheme to which the base station apparatus 20 responds is, for example, a radio scheme requested by a plurality of the service providers that provide a radio communication service.

Next, a specific configuration of the radio signal processing apparatus 10 and the base station apparatus 20 will be described.

The radio signal processing apparatus 10 includes an upper communication unit 101, a radio control information grant unit 102, a storage unit 103, and a lower communication unit 104. The upper communication unit 101 communicates with the outside system 30. For example, the upper communication unit 101 receives a packet from the outside system 30. The upper communication unit 101 outputs the received packet to the radio control information grant unit 102.

The radio control information grant unit 102 generates a control information grant packet by granting the radio control information to the packet received by the upper communication unit 101. The radio control information grant unit 102 may be configured to select the radio control information to be granted according to information stored in the packet or an input source of the packet (in FIG. 1, the outside system 30).

Additionally, when any value of the radio frequency specifier, the band specifier, the transmission gain specifier, the radio scheme specifier, and the radio scheme specific parameter is not specified by the service provider, the radio control information grant unit 102 sets the unspecified value to a default value.

Figure 2:
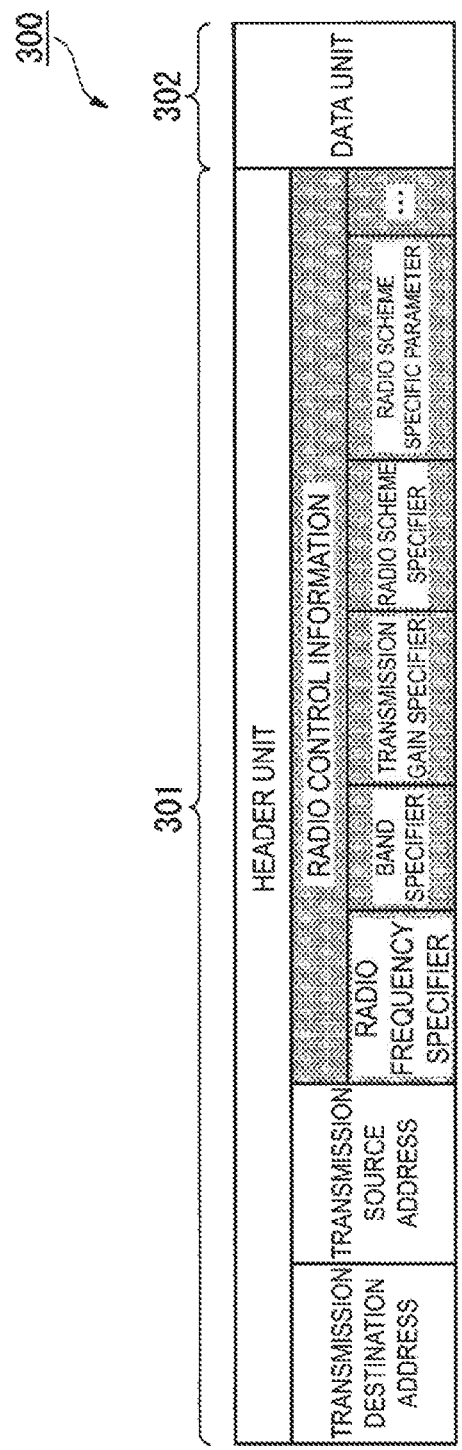
FIG. 2 is a diagram illustrating an example of a data structure of a control information grant packet.

FIG. 2 is a diagram illustrating example of a data structure of the control information grant packet.

As illustrated in FIG. 2, the control information grant packet is constituted with a header unit 301 and a data unit 302. The header unit 301 has fields for storing respective values of a transmission destination address, a transmission source address, and the radio control information. The transmission destination address represents an address of an apparatus that is a transmission destination of the control information grant packet. The transmission source address represents an address of an apparatus that is a transmission source of the control information grant packet. In FIG. 2, the radio control information includes respective values of the radio frequency specifier, the band specifier, the transmission gain specifier, the radio scheme specifier, the radio scheme specific parameter and the like.

The radio frequency specifier represents a center frequency specified for the base station apparatus 20 to perform radio communication. The band specifier represents a band specified to be used by the base station apparatus 20 in radio communication. The transmission gain specifier represents a transmission power specified to be used by the base station apparatus 20 in radio communication. The band radio scheme specifier represents a radio scheme used by the base station apparatus 20 in radio communication.

The radio scheme specific parameter is a parameter separately specified in radio communication, and is, for example, the number of retransmissions in a radio section.

Returning to FIG. 1, the description will be continued. The storage unit 103 stores program data of software of one radio scheme in advance.

The lower communication unit 104 communicates with the base station apparatus 20. For example, the lower communication unit 104 transmits the control information grant packet generated by the radio control information grant unit 102 to the base station apparatus 20. Additionally, the lower communication unit 104 exchanges program data of software of a radio scheme with the base station apparatus 20 according to a request from base station apparatus 20.

Specifically, according to the request from the base station apparatus 20, the lower communication unit 104 acquires program data of software of a radio scheme stored in the storage unit 103 and transmits the program data to the base station apparatus 20. Additionally, the lower communication unit 104 receives program data of software of a radio scheme transmitted from the base station apparatus 20, and stores the received program data of the software of the radio scheme in the storage unit 103. As described above, the exchange of program data of software of a radio scheme with the base station apparatus 20 is performed.

The base station apparatus 20 includes an upper communication unit 201, a downlink transmission adjustment unit 202, a storage unit 203, a setting unit 204, a packet conversion unit 205, and a radio frequency unit 206.

The upper communication unit 201 communicates with the radio signal processing apparatus 10. For example, the upper communication unit 201 receives the control information grant packet from the radio signal processing apparatus 10. The upper communication unit 101 exchanges program data of software of a radio scheme with the radio signal processing apparatus 10.

The downlink transmission adjustment unit 202 holds the control information grant packet received by the upper communication unit 201. The downlink transmission adjustment unit 202 outputs the control information grant packet held by the first-in first-out (FIFO) scheme to the setting unit 204.

The storage unit 203 stores program data of software of one radio scheme in advance.

The setting unit 204 sets the center frequency, the band, and the transmission gain for the time when the radio frequency unit 206 transmits an analog radio signal from an antenna unit using the radio frequency specifier, the band specifier, and the transmission gain specifier included in the radio signal control information of the header unit 301 of the control information grant packet. Note that the setting unit 204 may separately acquire, from the radio signal processing apparatus 10, information indicating where the radio signal control information is stored in information included the header unit 301 of the control information grant packet.

Additionally, the setting unit 204 reads program data of software of a radio scheme from the storage unit 203, and performs digital signal processing of modulation and demodulation by the radio scheme on the packet from which the radio control information has been removed. When the program data of the software of the radio scheme specified by the radio scheme specifier included in the radio signal control information of the header unit 301 of the control information grant packet is not stored in the storage unit 203, the setting unit 204 requests the program data of the software of the radio scheme specified by the radio scheme specifier to the radio signal processing apparatus 10 via the upper communication unit 201.

The packet conversion unit 205 removes the radio control information from the control information grant packet. The packet conversion unit 205 outputs the packet from which the radio control information has been removed to the radio frequency unit 206.

Figure 3:
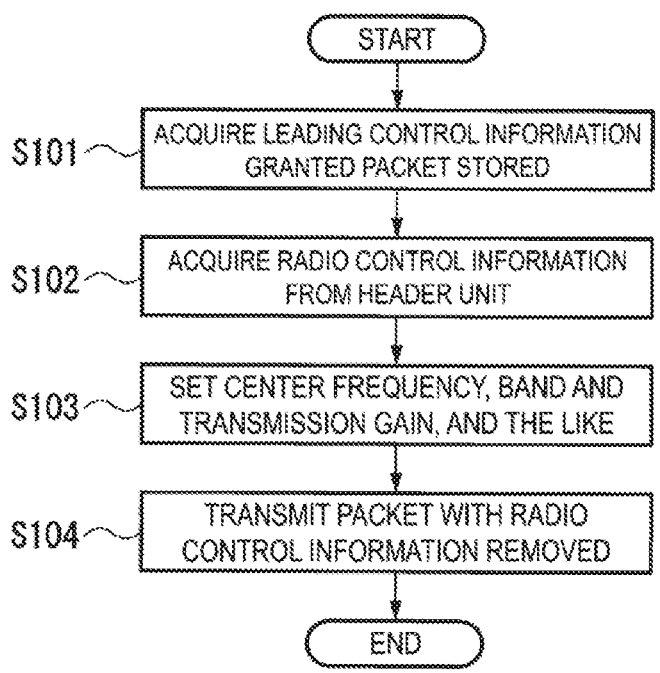
FIG. 3 is a flowchart illustrating a flow of processing of a base station apparatus 20.

The radio frequency unit 206 transmits the packet from which the radio control information has been removed as an analog radio signal via an antenna, with reference to the center frequency, the band, and the transmission gain that are set by the setting unit 204, FIG. 3 is a flowchart illustrating a flow of processing of the base station apparatus 20. The procedures illustrated in FIG. 3 are executed when the base station apparatus 20 transmits the packet received from the radio signal processing apparatus 10 to a destination via an antenna. The setting unit 204 acquires the leading control information grant packet stored in the downlink transmission adjustment unit 202 (step S101). The setting unit 204 may retrieve a plurality of the control information grant packets of the same classification as the leading control information grant packet, and read the radio control information from each of the header units 301 of the retrieved plurality of control information grant packets. The setting unit 204 acquires the radio control information from the header unit 301 of the acquired control information grant packet (step S102).

The setting unit 204 sets the center frequency, the band, and the transmission gain for the time when the radio frequency unit 206 transmits the analog radio signal from the antenna unit using the radio frequency specifier, the band specifier, and the transmission gain specifier included in the radio control information (step S103). The packet conversion unit 205 removes the radio control information from the control information grant packet. The radio frequency unit 206 transmits the packet from which the radio control information has been removed, as the analog radio signal via the antenna, with reference to the center frequency, the band, and the transmission gain that are set by the setting unit 204 (step S104).

According to the radio communication system 100 configured as above, the base station apparatus 20 selects the radio scheme to be used according to the reception of the control information grant packet to which the radio control information specifying the radio scheme be used for the radio communication is granted. As described above, the radio scheme is selected according to the packet arriving at the base station apparatus, and the radio scheme that does not require communication does not occupy a time. As a result, it is possible to improve the usage efficiency of the base station apparatus.

Additionally, by providing a unit for selecting an appropriate radio scheme according to a communication mode and a requirement of an application of the outside, the efficiency of radio communication can be improved.

Modification Example

Additionally, according to the present invention, by including a selection engine that selects the radio control information to be granted according to the information described in the packet or the input source of the packet, a unit for selecting an appropriate radio scheme is provided according to the communication mode and the requirement of the application of the outside, and thus the effect of improving the efficiency of radio communication can be achieved.

Second Embodiment

In the second embodiment, the radio control information grant unit is provided separately from the radio signal processing apparatus, and one radio signal processing apparatus processes the plurality of radio schemes to set the base station apparatus, which differ from the first embodiment. In the second embodiment, differences from the first embodiment will be described.

Figure 4:
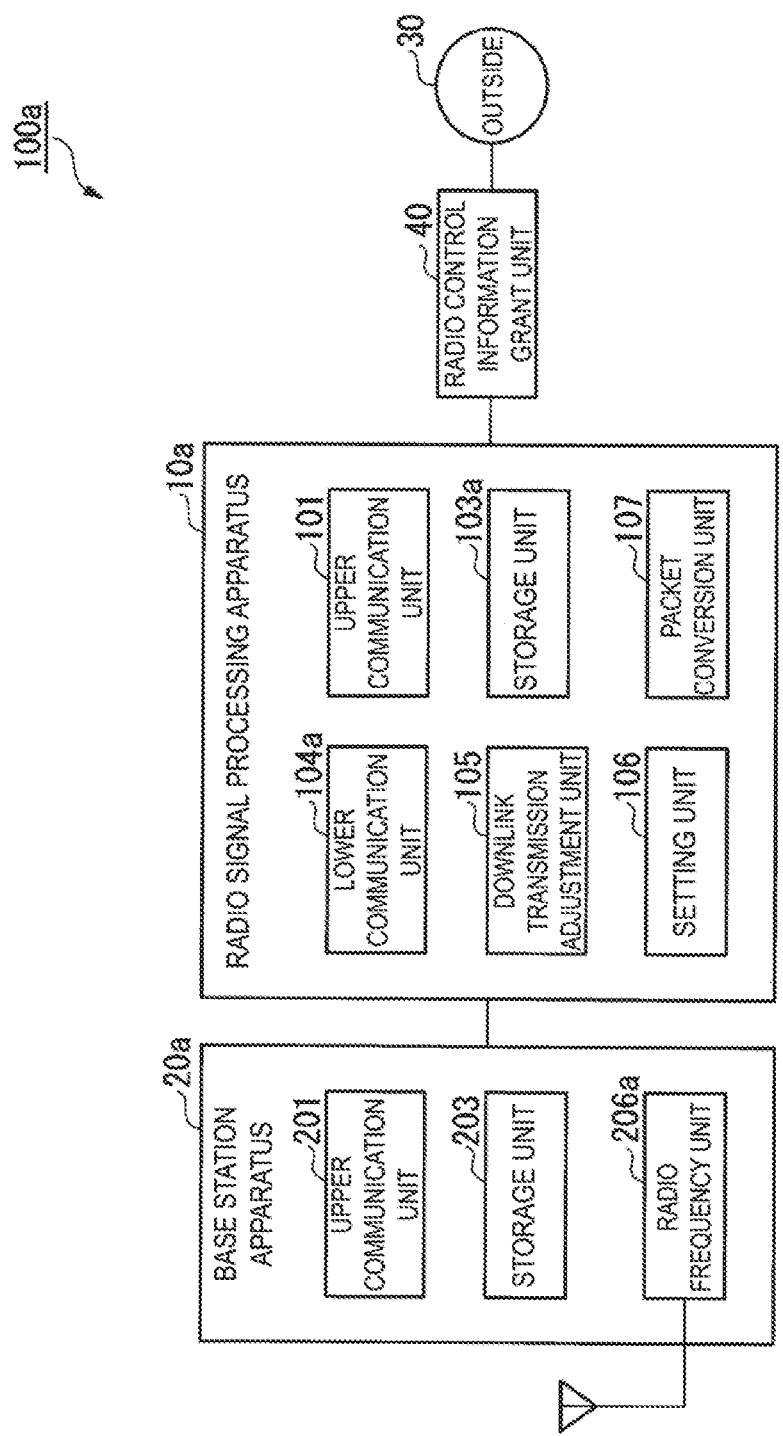
FIG. 4 is a configuration diagram illustrating a system configuration of a radio communication system according to a second embodiment.

FIG. 4 is a configuration diagram illustrating a system configuration of a radio communication system 100a according to the second embodiment.

The radio communication system 100a includes one or more radio signal processing apparatus 10a, one or more base station apparatus 20a, and a radio control information grant unit 40. Communication between the radio signal processing apparatus 10a and the base station apparatus 20a, and between the radio signal processing apparatus 10a and the radio control information grant unit 40 may be radio communication or wired communication. The outside system 30 that executes an application and the like connected to the radio communication system 100a is connected to the radio control information grant unit 40.

The radio control information grant unit 40 receives the packet transmitted from the outside system 30 and generates the control information grant packet by granting radio control information to the received packet. Note that the radio control information grant unit 40 may be configured to select radio control information to be granted according to the information stored in the packet or the input source of the packet.

The radio signal processing apparatus 10a selects one radio scheme from a plurality of radio schemes using the radio scheme specifier and the radio scheme specific parameter included in the control information grant packet received from the radio control information grant unit 40, performs processing according to the selected radio scheme, and transmits the packet from which the radio control information has been removed to the base station apparatus 20a. Additionally, the radio signal processing apparatus 10a stores the program data of the software of the plurality of radio schemes, and changes the software with the base station apparatus 20a.

The base station apparatus 20a is an apparatus that executes communication by the plurality of radio schemes. The base station apparatus 20a receives a packet transmitted from the radio signal processing apparatus 10a, and transmits the received packet to a destination.

Next, a specific configuration of the radio signal processing apparatus 10a and the base station apparatus 20a will be described.

The radio signal processing apparatus 10a includes the upper communication unit 101, a storage unit 103a, a lower communication unit 104a, a downlink transmission adjustment unit 105, a setting unit 106, and a packet conversion unit 107.

The storage unit 103a stores the program data of the software of the plurality of radio schemes in advance.

The downlink transmission adjustment unit 105 holds the control information grant packet received by the upper communication unit 101. The downlink transmission adjustment unit 105 outputs the control information granted packet held by the FIFO scheme to the setting unit 106.

The setting unit 106 sets the center frequency, the band, and the transmission gain in the base station apparatus 20 for the time when the radio frequency unit 206 transmits an analog radio signal from an antenna unit using the radio frequency specifier, the band specifier, and the transmission gain specifier included in the radio signal control information of the header unit 301 of the control information granted packet. Note that the setting unit 106 may separately acquire, from the radio control information grant unit 40, information indicating where the radio signal control information is stored in information included the header unit 301 of the control information granted packet.

Additionally, the setting unit 106 selects one radio scheme from one radio scheme of the plurality of radio schemes using the radio scheme specifier and the radio scheme specific parameter included in the radio signal control information of the header unit 301 of the control information granted packet. Additionally, the setting unit 106 reads the program data of the software of the selected radio scheme from the storage unit 103a, and performs digital signal processing of modulation and demodulation by the radio scheme on the packet from which the radio control information has been removed.

The packet conversion unit 107 removes the radio control information from the control information granted packet. The packet conversion unit 107 outputs the packet from which the radio control information has been removed to the lower communication unit 104a.

The lower communication unit 104a communicates with the base station apparatus 20a. For example, the lower communication unit 104a transmits the packet from which the radio control information has been removed by the packet conversion unit 107 to the base station apparatus 20a. Additionally, the lower communication unit 104a exchanges the program data of the software of the radio scheme with the base station apparatus 20a according to a request from the base station apparatus 20a.

The base station apparatus 20a includes the upper communication unit 201, the storage unit 203, and a radio frequency unit 206a.

The radio frequency unit 206a transmits the packet from which radio control information has been removed, as an analog radio signal via an antenna with reference to the center frequency, the band, and the transmission gain that are set by the setting unit 106 of the radio signal processing apparatus 10a.

According to the radio communication system 100a configured as described above, the same effect as in the first embodiment be obtained.

Third Embodiment

In a third embodiment, the radio control information grant unit is provided separately from the radio signal processing apparatus, and a radio scheme is selected with reference to the radio control information included in the control information granted packet obtained from the radio control information grant unit, and the packet is transmitted to the radio signal processing apparatus capable of processing the selected radio scheme, which differ from the first embodiment and the second embodiment. In the third embodiment, differences from the first embodiment and the second embodiment will be described.

Figure 5:
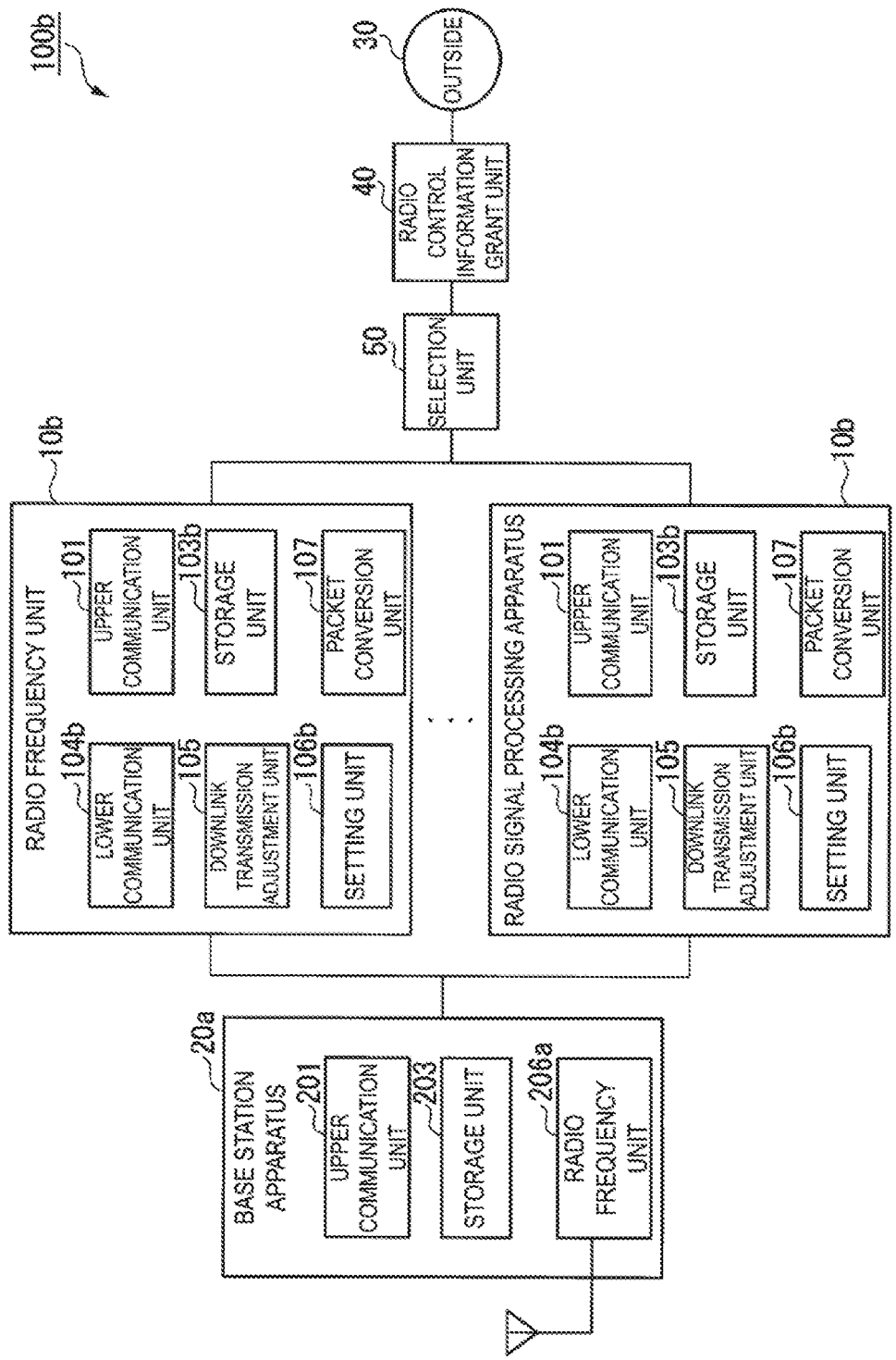
FIG. 5 is a configuration diagram illustrating a system configuration of a radio communication system according to a third embodiment.

FIG. 5 is a configuration diagram illustrating a system configuration of the radio communication system 100b according to the third embodiment.

The radio communication system 100b includes two or more radio signal processing apparatuses 10b, one or more base station apparatus 20b, the radio control information grant unit 40, and a selection unit 50. Communication between the radio signal processing apparatus 10b and the base station apparatus 20b, between the radio signal processing apparatus 10b and the selection unit 50, and between the selection unit 50 and the radio control information grant unit 40 may be radio communication or wired communication. The outside system 30 that executes an application and the like connected to the radio communication system 100b is connected to the radio control information grant unit 40.

The selection unit 50 selects the radio signal processing apparatus 10b that processes the control information granted packet from a plurality of radio signal processing apparatuses 10b with reference to the radio control information included in the control information granted packet received from the radio control information grant unit 40. Specifically, the selection unit 50 selects the radio signal processing apparatus 10b that can process the radio scheme indicated by the radio scheme specifier of the radio control information.

The selection unit 50 may store a table in which the radio signal processing apparatus 10b is associated with a radio scheme that can be processed by the radio signal processing apparatus 10b in advance and may select the radio signal processing apparatus 10b, or may inquire of all the radio signal processing apparatuses 10b about the available radio scheme, and select the processing apparatus 10b that can process the radio scheme. The selection unit 50 transmits the control information granted packet to the selected radio signal processing apparatus 10b.

When there are a plurality of radio signal processing apparatuses 10b capable of processing the radio scheme indicated by the radio scheme specifier of the radio control information, the selection unit 50 may randomly select the radio signal processing apparatus 10b, may select the radio signal processing apparatus 10b which is closest to the own apparatus, or may select the radio signal processing apparatus 10b which has a quick response.

The radio signal processing apparatus 10b performs processing of the specified radio scheme with respect to the control information granted packet received from the selection unit 50, and transmits the packet from which the radio control information has been removed to the base station apparatus 20a. Additionally, the radio signal processing apparatus 10b stores program data of software of one radio scheme, and changes software with the base station apparatus 20b.

Next, a specific configuration of the radio signal processing apparatus 10b will be described.

The radio signal processing apparatus 10b includes the upper communication unit 101, a storage unit 103b, a lower communication unit 104b, the downlink transmission adjustment unit 105, the packet conversion unit 107, and a setting unit 106b.

The storage unit 103b stores the program data of the software of a plurality of radio schemes in advance.

The lower communication unit 104b communicates with the base station apparatus 20a. For example, the lower communication unit 104b transmits the packet from which the radio control information has been removed by the packet conversion unit 107 to the base station apparatus 20a. Additionally, the lower communication unit 104b exchanges the program data of the software of the radio scheme with the base station apparatus 20a according to a request from the base station apparatus 20a.

The setting unit 106b sets the center frequency, the band, and the transmission gain in the base station apparatus 20a for the time when the radio frequency unit 206a transmits an analog radio signal from an antenna unit using the radio frequency specifier, the band specifier, and the transmission gain specifier included in the radio signal control information of the header unit 301 of the control information granted packet. Note that the setting unit 106b may separately acquire, from the radio control information grant unit 40, information indicating where the radio signal control information is stored in information included the header unit 301 of the control information granted packet.

Additionally, the setting unit 106b reads the program data of the software of a radio scheme from the storage unit 103a, and performs digital signal processing of modulation and demodulation by the radio scheme on the packet from which the radio control information has been removed.

According to the radio communication system 100b configured as described above, the same effect as in the first embodiment can be obtained.

Additionally, the selection unit 50 selects the radio signal processing apparatus 10b capable of processing the control information granted packet from a plurality of radio signal processing apparatuses 10b. As a result, it is possible to reduce the loss of the control information granted packet due to the inability to process.

Modification Example Common to First Embodiment to Third Embodiment

In the first embodiment to third embodiment described above, the values of the radio frequency specifier, the band specifier, the transmission gain specifier, the radio scheme specifier, and the radio scheme specific parameter are stored as the radio control information, in the header unit 301 of the control information granted packet. As a result, the configuration is illustrated in which the setting unit 204 and the setting unit 106 acquire the radio frequency specifier, the band specifier, and the transmission gain specifier from the radio control information included in the control information granted packet and set the radio frequency specifier, the band specifier, and the transmission gain specifier in the radio frequency unit 206 and the radio frequency unit 206a. However, the setting unit 204 and the setting unit 106 may be configured to acquire the radio frequency specifier, the band specifier, and the transmission gain specifier as follows. Specifically, first, the radio control information grant unit 102 and the radio control information grant unit 40 generate the control information granted packet by granting the radio scheme specifier and the radio scheme specific parameter as the radio control information to the packet.

The setting unit 204 and the setting unit 106 hold a parameter acquisition table illustrated in FIG. 6, and acquire the band specifier, the transmission gain specifier, and the radio scheme specifier using the radio scheme specifier included in the received control information granted packet and the parameter acquisition table.

FIG. 6 is a diagram illustrating a specific example of the parameter acquisition table. As illustrated in FIG. 6, in the parameter acquisition table, the values of the band specifier, the transmission gain specifier, and the radio scheme specifier are associated with each radio scheme specifier.

The embodiments of the present invention have been described above in detail with reference to the drawings. However, specific configurations are not limited to those embodiments, and include any design or the like within the scope not departing from the gist of the present invention.

REFERENCE SIGNS LIST 10, 10a, 10b Radio signal processing apparatus
20, 20a Base station apparatus
30 Outside system
40 Radio control information grant unit
50 Selection unit
101 Upper communication unit
102 Radio control information grant unit
103, 103a, 103b Storage unit
104, 104a, 104b Lower communication unit
105 Downlink transmission adjustment unit
106 Setting unit
107 Packet conversion unit
201 Upper communication unit
202 Downlink transmission adjustment unit
203 Storage unit
204 Setting unit
205 Packet conversion unit
206, 206a Radio frequency unit

The invention claimed is:

1. A radio communication method in a radio communication system comprising a base station apparatus and a radio signal processing apparatus for communicating with the base station apparatus, the radio communication method comprising:
granting radio control information to a packet, where the radio control information specifies a radio scheme to be used as a parameter required for radio communication and the parameter comprising a value of a radio frequency, a value of a band, and a value of a transmission gain specified to be used in radio communication,
setting a value of the radio frequency, a value of the band, and a value of the transmission gain of the base station apparatus; and
transmitting the packet from the base station apparatus after the radio control information has been removed from the packet, where the packet is transmitted in accordance with the radio scheme specified by the radio control information and the value of the radio frequency, the value of the band, and the value of the transmission gain set on the base station apparatus.

2. The radio communication method according to claim 1, further comprising: when a piece of the radio signal processing apparatus is capable of processing a plurality of radio schemes,
performing, by the radio signal processing apparatus, a first selection of a radio scheme to be used for the radio communication from the plurality of radio schemes with reference to the packet to which the radio control information is granted in granting the radio control information,
wherein the radio signal processing apparatus uses the radio scheme selected in the first selection to process the packet to which the radio control information is granted and transmit the processed packet to the base station apparatus.

3. The radio communication method according to claim 1, further comprising:
when a piece of the radio signal processing apparatus is capable of processing one radio scheme,
performing a second selection of a radio signal processing apparatus capable of processing the packet to which the radio control information is granted with reference to the packet to which the radio control information is granted in granting the radio control information,
wherein the packet to which the radio control information is granted is transmitted to the radio signal processing apparatus selected in the second selection, and
the radio signal processing apparatus processes the packet to which the radio control information is granted using an available radio scheme and transmit the processed packet to the base station apparatus.

4. A base station in a radio communication system comprising a base station and a radio signal processing apparatus that communicates with the base station, the base station comprising:
a processor; and a storage medium having computer program instructions stored thereon, when executed by the processor, perform to:
receive a packet to which radio control information comprising at least information specifying a radio scheme to be used is granted as a parameter required for radio communication and the parameter comprising a value of a radio frequency, a value of a band, and a value of a transmission gain specified to be used in radio communication;
set a value of the radio frequency, a value of the band, and a value of the transmission gain of the base station; and
transmit the packet from which the radio control information has been removed, in accordance with the value of the radio frequency, the value of the band, and the value of the transmission gain set on the base station and by the radio scheme specified in the radio control information granted to the received packet.

* * * * *